Feb. 24, 1959 G. L. ROBINSON Re. 24,606

REPLACEABLE SUPPORT FOR REFRACTORY LINING OF FURNACE DOORS

Original Filed Sept. 28, 1949 2 Sheets-Sheet 1

INVENTOR
George L. Robinson
by Hoopes, Leonard & Glenn
his attorneys

REPLACEABLE SUPPORT FOR REFRACTORY LINING OF FURNACE DOORS

Original Filed Sept. 28, 1949 2 Sheets-Sheet 2

INVENTOR
George L. Robinson
by Hoopes, Leonard & Glenn
his attorneys

United States Patent Office

Re. 24,606
Reissued Feb. 24, 1959

24,606

REPLACEABLE SUPPORT FOR REFRACTORY LINING OF FURNACE DOORS

George L. Robinson, Pittsburgh, Pa., assignor, by mesne assignments, to Blaw-Knox Company, Pittsburgh, Pa., a corporation of Delaware Original No. 2,673,533, dated March 30, 1954, Serial No. 118,336, September 28, 1949. Application for reissue November 14, 1956, Serial No. 622,233

8 Claims. (Cl. 110—173)

Matter enclosed in heavy brackets [ ] appears in the original patent but forms no part of this reissue specification; matter printed in italics indicates the additions made by reissue.

This invention relates to replaceable supports, that is, anchor members for the refractory lining of furnace doors. More particularly, it pertains to a socket and replaceable anchor stud combination for plastic refractory lined furnace doors such as those used on open-hearth furnaces.

It is customary to line water-cooled furnace doors with a plastic refractory cast in the hollow recess of the door, and to secure the lining to the door by means of metal studs projecting from the face of the door and embedded in the refractory, the studs being secured to the face of the door by some means. The refractory lining and the studs are consumed or eroded away by action of the hot furnace gases, and require replacement after about one to three months of service. The furnace door itself may last about four to five years before it must be replaced. A typical steel mill may have about ten to twelve furnaces, each with five doors. If these doors require relining at about six week intervals, it is evident that about nine or ten of these doors may have to be relined each week. It is apparent, therefore, that a new construction and manner of fastening anchor studs which increases the ease and economy of re-studding and re-lining a furnace door is important.

Various means for securing such studs to the door have been suggested and used. Assuming such studs have the same material and spacing, they are believed to give comparable performance during the time the door is on the furnace. However, they are not as satisfactory as the replaceable supports of this invention insofar as ease and cost of replacement are concerned. Thus, the most common practice is to weld one end of the stud to the face of the recess in the door. When such a door is to be relined the residual ends of the consumed studs must be burned or clipped off at the door face. Such preparation for the welding on of new studs, as well as the welding itself, is expensive. Other fastenings for studs, not requiring welding, have also been suggested. Some of these involve holding a rearward extension of the stud in the hollow water-cooled body of the door, and are not only relatively high in cost but impose restrictions on the door construction to accommodate the desired stud spacing. Others, such as nuts permanently welded to the face of the door into which studs with threaded ends are screwed, have proved impractical due to the difficulty of removing the stud-end of the burned-down stud from the nut. None of the prior devices has been wholly satisfactory and some better solution to the problem has long been desired.

The instant invention overcomes these difficulties in that the anchor members are readily replaceable despite any bending or movement in the structure of the door which may occur in operation. Further, the retaining and anchoring members which are made in accordance with this invention are readily applied to a wide variety of furnace doors; involve no larger repair problem when the relining thereof is in order; and permit the same unskilled workmen who are to renew the plastic lining to replace the burned studs quickly and effectively before the new relining is cast.

Other objects and advantages of this invention will be apparent from the following description and the drawings, which are illustrative only, in which—

Figure 1:
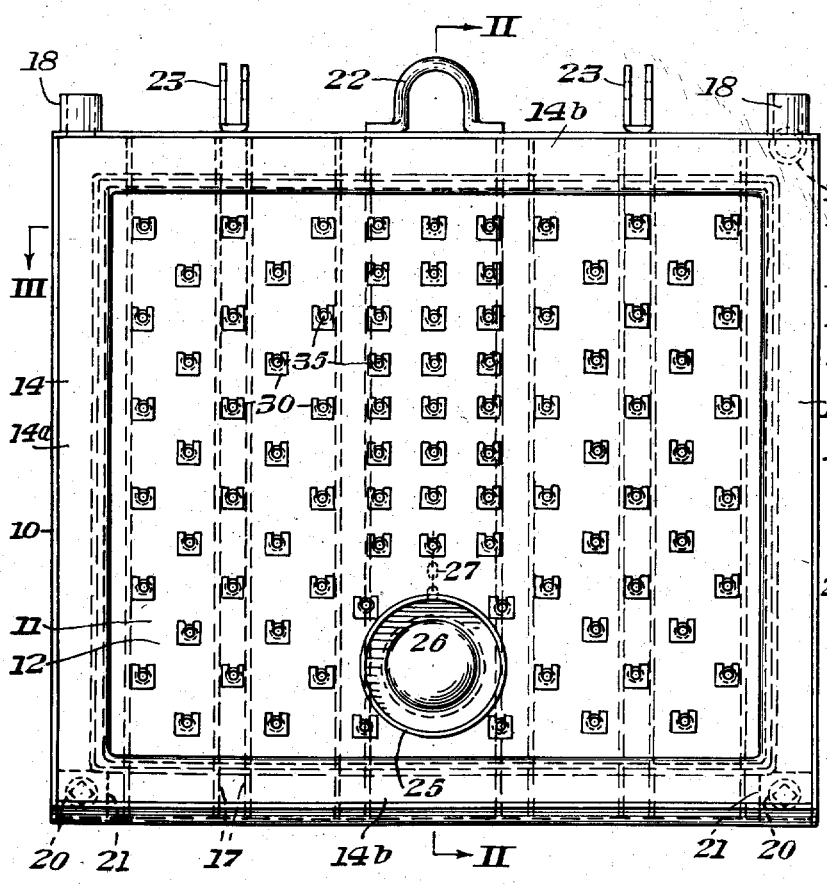
Figure 1 is a view in front elevation of a furnace door employing the combination of this invention.
Figure 2:
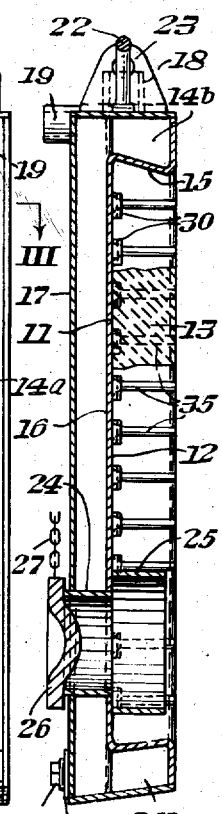
Figure 2 is a vertical cross sectional view taken along line II—II of Figure 1 and showing a portion of a plastic refractory lining in place.
Figure 3:
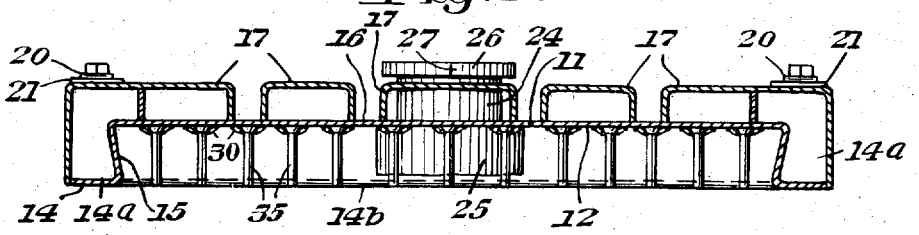
Figure 3 is a horizontal cross sectional view taken along line III—III of Figure 1.
Figure 4:
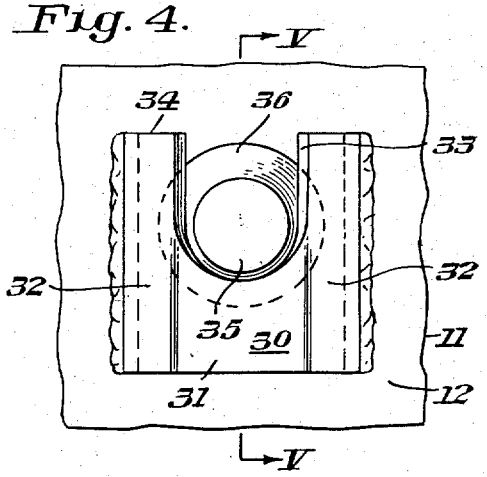
Figure 4 is a view in front elevation of a preferred embodiment of this invention.
Figure 5:
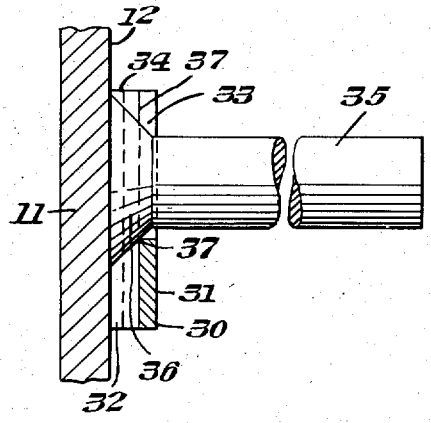
Figure 5 is a view in side elevation of the preferred embodiment of Figure 4 taken along line V—V of Figure 4 through the retaining member.
Figure 6:
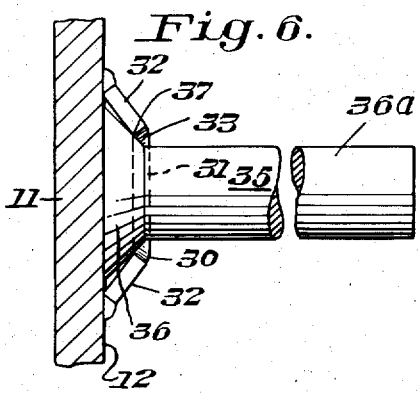
Figure 6 is a plan view of the preferred embodiment shown in Figure 4.

The preferred embodiment of this invention illustrated in enlarged view in Figures 4 to 6 inclusive is applied to the furnace door shown in Figures 1 to 3 inclusive. This furnace door is the subject of United States patent application Serial No. 613,073 filed August 28, 1945, in the name of Edward W. Pottmeyer, now Patent No. 2,547,229. Although the door of the said application Serial No. 613,073 is particularly useful in the practice of the instant invention, the instant invention may also readily be used with both solid and full panel type furnace doors.

In Figures 1 to 3, such a furnace door 10 has an inner wall 11, the inner side 12 of which comprises the face of the door against which a plastic refractory lining 13 is periodically cast as each relining is performed. A hollow peripheral flange 14 extends around the outside of the door 10. These flanges have inner sides 15 set at a slight angle to each other to form a dovetail fit with plastic lining 13. Wall 11 also has a rear or outer surface 16 against which water-cooling means are applied. These water-cooling means comprise a series of vertical channels 17 which intercommunicate with each other and with vertical flanges 14a through the horizontal flanges 14b of the hollow peripheral flange. Pipe nipples 18 welded to the top of door 10 respectively form an inlet and an outlet to the cooling water passages through door 10. A vent nipple 19 is also provided for door 10 with access to the water cooling passages therein. Washout plugs 20 are threaded into tapped holes in blocks 21, which tapped holes communicate with the cooling water passages in door 10 at the bottom of the vertical rails 14a of flange 14. A lifting yoke 22 and lugs 23 for conventional counterbalance cables afford a conventional arrangement for the raising and lowering of door 10.

Rings 24 and 25 are in registry and together form an observation port through door 10 including the central channel 17. A cover 26 normally rests against ring 24 and closes the port. Cover 26 is operated by means of a chain 27 in a conventional manner.

In the preferred embodiment a plurality of retaining members 30 is welded in a predetermined pattern to surface 12. This pattern may be varied so long as it furnishes the required support for a plastic refractory lining to be cast against surface 12 and the respective inner sides 15. Each retaining member 30 is in the form of a socket of a material like sheet steel bent into the form of a longitudinal arch having a longitudinal central portion 31 spaced away from surface 12. This spacing is obtained by the divergence of two *straps shown as* side portions 32 extending toward surface 12 so that the innermost side edges thereof may be welded to metal wall 11. A U-shaped recess 33 is cut or punched through central portion 31 for a substantial portion of the length thereof downwardly from the top edge 34 of socket 30. Since central portion 31 and sides 32 are each relatively plane, the space between recess 33 and the lower part of portion 31 and surface 12 is relatively trapezoidal in configuration.

As a consequence, an anchoring member such as a stud 35 having an outwardly flared or countersunk base 36 of greater diameter than the width of recess 33, can be held tightly against surface 12 by sliding it with body 36a substantially between recess 33 and surface 12. The base 36 of stud 35 is of a diameter which readily passes through recess 33 between the sides thereof so that it extends normal to wall 11 into the space to be occupied by alining 13. In practice, stud 35 is a rivet with a countersunk head, which head acts as base 36. In the formation as by bending of socket 30, the slope of sides 32 is generally similar to the flaring of the sides of base 36. Thus, as shown in Figure 6, the inner edge 37 normally bears against base 36 to insure a proper fit between stud 35 and socket 30 there being enough give, which may be termed elasticity or resiliency or flexibility, in the metal of the arched socket, for example, to enable it to hold the stud 35 tightly against surface 12 when the stud is knocked into place as will be understood fully by those in the art to whom this invention is disclosed.

Because of the arch shape of retaining member 30, it is open at the top and at the bottom as shown in Figure 5. Any refractory or other material which may accumulate around base 36 within socket 30 during use is readily removable either when the stub end of stud 35 is removed or thereafter. Such stub ends can readily be removed by knocking them up by hammer blows and out of their respective sockets 30. Any other material between socket 30 and wall 11 can be dislodged by further blows or by poking the material out with a chisel. Thereafter, new studs 35 may be knocked into place by moving them downwardly in recess 33 generally parallel to wall 11. Although the rearmost portion of the sockets 30 is illustrated as surface 12, such sockets may, if desired, be provided with back plates of their own which back plates can then be welded to wall 11 to form the combination of this invention. Further, although the recesses 33 are illustrated as being U-shaped in vertical position, various departures from such shape and orientation may be made in particular cases.

It is evident that socket blanks can be stamped out or otherwise cut and recessed and bent very quickly and inexpensively. Such sockets would then be welded in a predetermined pattern to the particular furnace door to be used. In the case of full panel type doors using box-type panels with vertical spaces between or in the event there are observation openings for the refractory lining through the back of the door and through a wall portion corresponding to wall 11, suitable blanking off pieces can be used to fill such spaces during the casting operation while the refractory lining is still plastic. Subsequently, such blanking off pieces may readily be removed. In using a furnace door of the type illustrated in the aforesaid application Serial No. 613,073, the pattern for the sockets 30 need not make any allowance for the immediate presence of water cooling means directly in back of the respective socket on the other side of wall 11. Thus, as shown in Figure 3, sockets 30 may be directly in front of a channel 17 or directly in front of the space between adjacent such channels or directly in front of the flange of a channel affixed to surface 16.

As the lining 13 is consumed or eroded away, the studs 35 also progressively burn away. However, the studs are not completely consumed since a short stub end will remain even though the lining around it is completely consumed. It has been found in tests of the improved stud and fastening of this invention that no fusing of such stub end to its anchor socket, such as socket 30, occurs on such exposure although the exposure may be prolonged for a substantial period of time. And despite such exposure, the stub end is still easily removable and the socket remains in good condition indefinitely for the reception of new studs when the door is to be relined. Such severe exposure is not usual because furnace doors are usually relined before metal plate 11 is exposed, but it occasionally occurs. Thus, it is a further important advantage of this invention that the time of relining is not critical in relation to the functioning of the device of this invention.

When such a door is to be relined, an unskilled workman can readily hammer the old studs 35 out of the sockets 30 and similarly dislodge any hardened plastic or other material which may have collected around base 36 in socket 30. Such dislodgment is facilitated by the open bottom of socket 30 permitting the material to fall free where it can be swept away. The insertion of new studs 35 is then readily accomplished by sliding them into place with the aid of such hammer blows as may be required. A rigid pattern of new anchor members is thus quickly obtained for the new lining which can then be cast.

Figure 7:
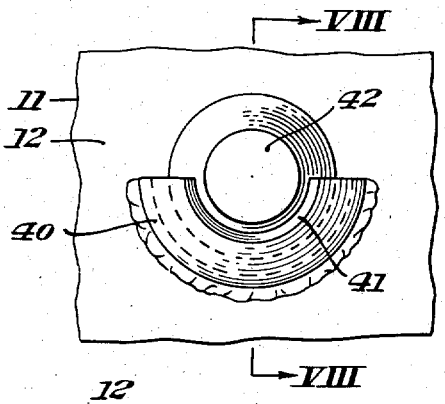
Figure 7 is a view in front elevation of a modified embodiment of this invention.
Figure 8:
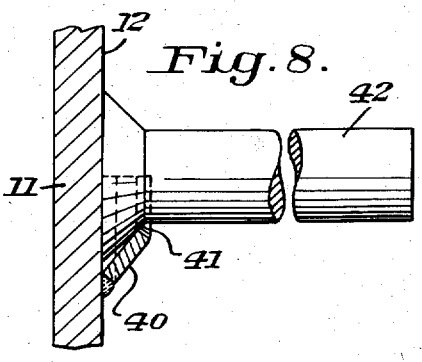
Figure 8 is a view in elevation of the modified embodiment shown in Figure 7 taken along line VIII—VIII of Figure 7 through the retaining member.
Figure 9:
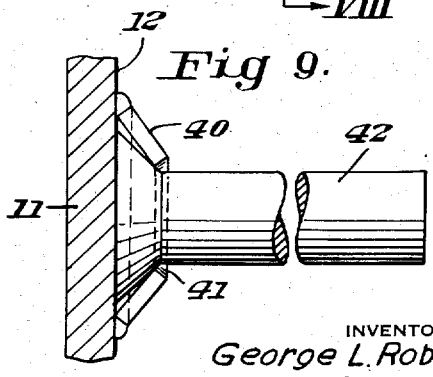
Figure 9 is a plan view of the modified embodiment shown in Figure 7.

In Figures 7 to 9 inclusive, a modified socket 40 is shown substantially in the form of one-half of a conical washer. A recess 41 is provided by the opening in such washer which recess accommodates a stud 42 which is identical with stud 35. The rearwardly extending edge of socket 40 is welded to a wall surface such as wall 11 and functions substantially as socket 30 functions except that socket 40 has no bottom opening for the convenient dislodgment of caked or accumulated material. Moreover, socket 40 offers somewhat less support to the anchor members than does the preferred embodiment socket 30.

The particular shape and orientation of the retaining members and of the recesses therein and of the locking space defined thereby for a generally corresponding cross section of the cooperating anchor members are matters which may be widely varied and still be within the spirit of this invention as defined by the scope of the appended claims.

I claim:

1. In a plastic refractory lined furnace door, in combination, a wall having a face against which refractory is placed, a socket permanently fastened to said face, said socket having a portion close to but spaced from said face, said portion having a recess therein, a stud having a body and a base, said body having a width less than the width of said base, said recess having a width less than the width of said base but greater than the width of said body, said base having a length movable between said face and said portion to hold the remainder of said stud extending through said recess normal to said face to anchor said refractory.

2. In a plastic refractory lined furnace door, in combination, a wall having a face against which refractory is placed, a plurality of sockets permanently fastened to said face, each of said sockets having a central portion closely parallel to but spaced from said face and side portions extending between said central portion and said face, said central portion having a recess therein, a stud for each of said sockets, each stud having a body and a base, said body having a width less than the width of said base, said recess having a width less than the width of said base but greater than the width of said body, said base having a length approximating the distance between said central portion and said face, said stud being slidable parallel to said face with its axis perpendicular thereto and into said recess with said base between said central portion adjacent said recess and said face to hold the remainder of said stud extending through said recess and normal to said face to anchor said refractory.

3. In a plastic refractory lined furnace door, in combination, a wall having a surface against which refractory is placed, a retaining member having a central portion closely parallel to but spaced from said surface and side portions extending between the sides of said central portion and said surface, the edges of said side portions adjoining said surface being permanently affixed to said wall at said surface, said central portion having an end spaced from said surface, said central portion further having a recess forming a slot extending to said end, a stud having a body and base, said base being wider than said body and said recess, said recess being wider than said body, said base removably fitting between said central portion, said side portions and said surface to hold the remainder of said stud extending through said recess normal to said surface to anchor said refractory.

4. In a plastic refractory lined furnace door, in combination, a wall having a surface against which refractory is placed, a plurality of sheet metal sockets and metal stud anchors for said refractory, each socket being welded to said wall at said surface, said socket having a central portion closely parallel to but spaced from said surface and side portions extending between said central portion and said surface, said central portion having upper and lower edges spaced from said surface and a recess forming a slot extending downwardly from said upper edge, a stud for each socket having a body and base, said base being wider than said body and said recess, said base further having a length generally equal to the distance between said central portion and said surface, said recess being wider than said body, said base being slidable parallel to said surface and between said central portion and said surface to hold the remainder of said stud extending through said recess normal to said surface to anchor said refractory.

*5. In a furnace door having a wall with a face against which refractory is placed to line said door, in combination, a stud mounting socket having at least one edge permanently fastened to said face, said socket having a raised portion close to but spaced from said face, said portion having a recess therein affording access to the space between said portion and said face, said last-mentioned space having an unobstructed width greater than the width of said recess, said recess further having an unobstructed entry portion, said socket extending to each side of said recess to overlie said space to each such side.*

*6. In a furnace door having a wall with a face against which refractory is placed to line said door, in combination, a stud mounting retaining member structure comprising a pair of respectively spaced sides having opposed edges, said opposed edges of said sides being spaced from said face and from each other for at least a part of their length to define a recess therebetween parallel to said face, there being an unobstructed opening extending transversely of said sides in the space between said sides and said face, and a welded connection for each of said sides to said wall and from which said sides arch toward said recess.*

*7. In a studded furnace door of the water-cooled type having a back plate with a reentrant portion defining a recess for the reception of a monolithic lining of refractory material, a stud mounting structure comprising a pair of metal straps spaced from each other to define a notch with coplanar stud mounting edges respectively spaced from and parallel to said back plate, there being an unobstructed opening extending transversely of said straps in the space between the straps and said back plate, and a welded connection at one end of each of said straps to said plate and about which a length of the strap may resiliently flex.*

*8. In a studded furnace door of the water-cooled type having a back plate with a reentrant portion defining a recess for the reception of a monolithic lining of refractory material, a stud mounting structure comprising a pair of metal straps spaced from each other to provide a space therebetween with coplanar stud mounting edges respectively spaced from and parallel to said back plate, there being an unobstructed opening extending transversely of said straps in the space between the straps and said back plate, a welded connection at one end of each of said straps to said plate and about which a length of the strap may resiliently flex, and a stud projecting through said space and having an enlarged end of frusto-conical shape, said enlarged end having an axial length longer than the opening of said straps from said back plate whereby adjacent edges of said straps will engage with and be flexed outwardly by the frusto-conical surface of said enlarged end upon movement of said stud to a position in which it projects through said space.*

References Cited in the file of this patent or the original patent

UNITED STATES PATENTS

| | | |
|---|---|---|
| 282,846 | Cole | Aug. 7, 1883 |
| 488,851 | Stock | Dec. 27, 1892 |
| 614,177 | McBride | Nov. 15, 1898 |
| 739,326 | Leonard | Sept. 22, 1903 |
| 1,127,596 | Crabiel | Feb. 9, 1915 |
| 1,588,566 | Wismer | June 15, 1926 |
| 1,951,115 | Wonsowicz | Mar. 13, 1934 |
| 1,953,856 | Heyman | Apr. 3, 1934 |
| 2,037,018 | Hall | Apr. 14, 1936 |
| 2,063,261 | Mees | Dec. 8, 1936 |
| 2,103,106 | Yurkovitch | Dec. 21, 1937 |
| 2,124,425 | McAfoos | July 19, 1938 |
| 2,127,973 | Isett | Aug. 23, 1938 |
| 2,325,945 | Fuchs | Aug. 3, 1943 |
| 2,395,757 | Peters | Feb. 26, 1946 |
| 2,477,161 | Ausland et al. | July 26, 1949 |
| 2,513,626 | Corriston | July 4, 1950 |